United States Patent [19]

Baxter

[11] Patent Number: 4,935,924
[45] Date of Patent: Jun. 19, 1990

[54] SIGNAL DISTRIBUTION NETWORK

[75] Inventor: Thomas Baxter, Westerham, England

[73] Assignee: U.S. Philips Corporation, New York, N.Y.

[21] Appl. No.: 296,461

[22] Filed: Jan. 12, 1989

[30] Foreign Application Priority Data

Jan. 22, 1988 [GB] United Kingdom ................. 8801440

[51] Int. Cl.$^5$ ............................ H04H 1/08; H04J 1/02
[52] U.S. Cl. ....................................... 370/73; 370/124; 455/4; 455/6; 358/86
[58] Field of Search ................... 370/69.1, 73, 76, 124, 370/110.1; 379/101; 358/86, 181, 194.1; 455/3, 4, 5, 6, 68, 69, 70

[56] References Cited

U.S. PATENT DOCUMENTS

| | | | |
|---|---|---|---|
| 4,488,179 | 12/1984 | Krüger et al. | 358/181 |
| 4,527,204 | 7/1985 | Kozakai et al. | 358/194.1 |
| 4,656,629 | 4/1987 | Kondoh et al. | 358/86 |
| 4,698,670 | 10/1987 | Matty | 455/4 |
| 4,787,085 | 11/1988 | Suto et al. | 455/6 |
| 4,808,992 | 2/1989 | Beyers, Jr. et al. | 358/181 |

Primary Examiner—Douglas W. Olms
Assistant Examiner—Wellington Chin
Attorney, Agent, or Firm—Robert T. Mayer

[57] ABSTRACT

A signal distribution cable network in which a plurality of information channels are defined by respective carrier frequencies and serve a plurality of local signal sources (SS1, SS2, SS3) and signal destination receivers (SR1, SR2, SR3) connected to the network. The network has a channel allocation controller (CT) which operates on request to allocate temporarily an unused channel for transporting signals from a local signal source (SS1, SS2, SS3) to a signal destination receiver (SR1, SR2, SR3). The controller (CT) transmits tuning signals to the local signal source and the signal destination receiver to tune them to the carrier frequency of the allocated channel. The channel allocation excludes channels which normally carry signals from external signal sources.

11 Claims, 6 Drawing Sheets

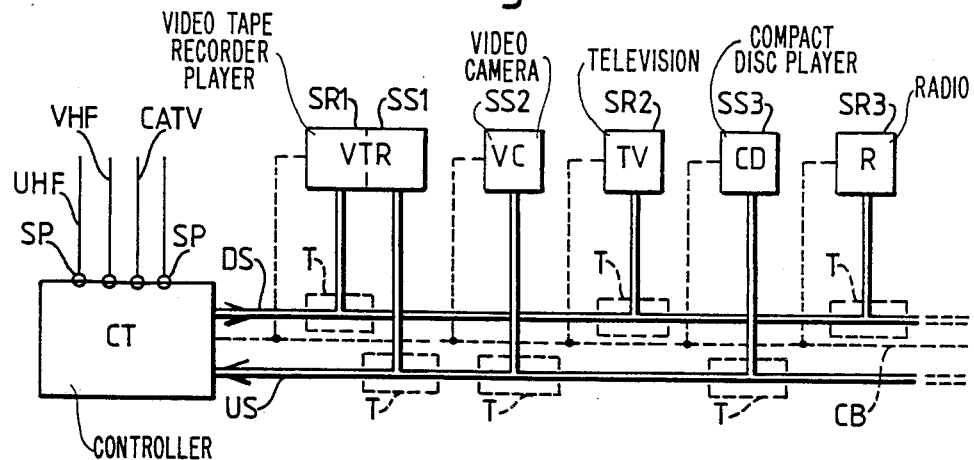
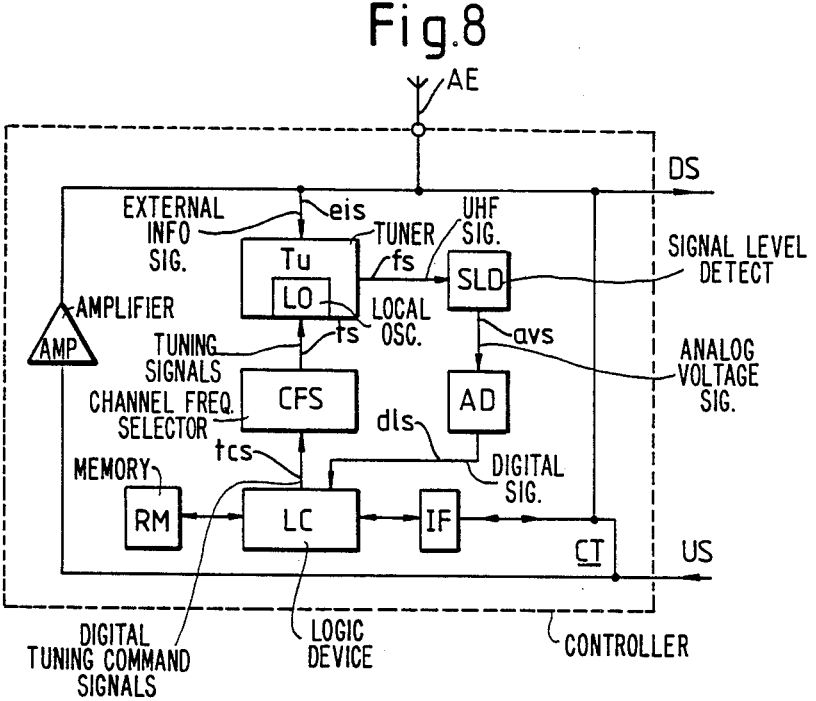

Fig. 2
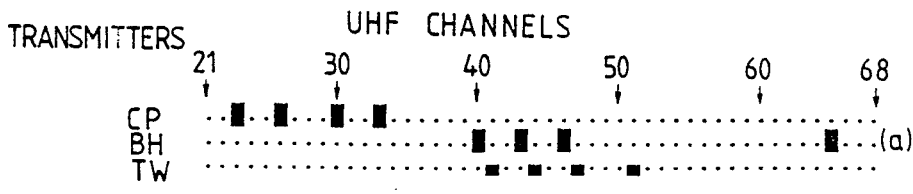
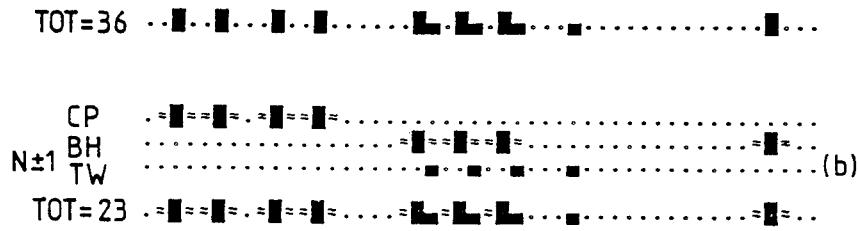
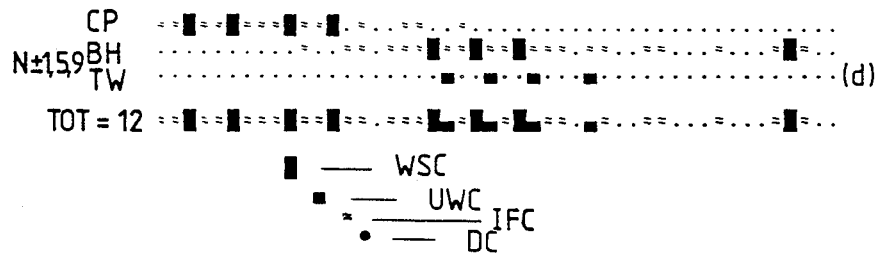

SIGNAL DISTRIBUTION NETWORK

DESCRIPTION

This invention relates to signal distribution networks in which information signals from different signal sources are transported in separate information channels which are provided in a common transmission medium.

The invention relates more particularly to signal distribution networks of a type in which the common transmission medium is a cable and in which frequency division multiplexing is employed to provide a plurality of information channels which are defined by respective carrier frequencies.

There is proposed for a domestic environment a signal distribution cable network which is capable of providing a plurality of information channels suitable for transporting a wide range of information signals, including UHF television signals and FM radio signals, together with associated high and low speed control signals. Some signal sources which feed the network will be external to the domestic environment (e.g. terrestrial broadcast and cable television stations and FM radio stations) and other signal sources will be local sources (e.g. a video tape recorder, a video camera and a compact disc player).

Such a network will thus be required to transport both externally and locally generated information signals to different signal destination receivers connected to the network cable with an acceptable signal quality, together with the transport of control signals for selecting the information signals required at different signal destination receivers.

It is an object of the present invention to provide a signal distribution cable network of the type set forth above in which information channel allocation for the transport of both externally and locally generated information signals is achieved in an advantageous manner.

Accordingly the invention, is characterized in that a signal distribution cable network comprises a channel allocation controller which is operable on request to allocate temporarily an unused channel for the transport of information signals from a local signal source to a signal destination receiver, the controller including means for transmitting tuning signals to the local signal source and the signal destination receiver to tune them to the carrier frequency of the allocated channel, and the controller being operable to exclude from further allocation the allocated channel whilst it is in use.

Such a network has the advantage that a number of local signal sources connected to the network can share a lesser number of channels in an efficient manner.

In carrying out the invention the channel allocation controller can include means operable on initialisation of the network to determine the signal level in each information channel, and means responsive according as the signal level of a channel is below or above a first reference level to grade the channel as being suitable or not as a free channel for temporary allocation for the transportation of information signals from a local signal source connected to the network.

Each local signal source connected to the network cable can include a programmable modulator to enable the controller to select for a local signal source that is to transmit the carrier frequency which defines the allocated channel.

A serial digital data link included in the network can use the network cable for the transmission of control signals between the controller and the local signal sources and the signal distination receivers, to effect the tuning thereof to an allocated channel.

In respect of information channels for transporting UHF signals, a channel allocation strategy governing the temporary allocation of unused channels for the transport of information signals from local signal sources preferably involves that for the transport of information signals from external signal sources there is the permanent allocation of respective information channels whose carrier frequencies are the same as the carrier frequencies of these external signal sources, and for the transport of information signals from any local signal source which is to transmit there is the temporary allocation of an unused channel from all the remaining unused channels in which the prevailing signal level is less than a given value and on the basis of at least one channel separation rule which aims at minimizing cross-channel interference.

The channel allocation strategy used can involve a so-called $N\pm 1$ rule, that is, no channel allocation in respect of a local signal source is made of a channel which is plus or minus one channel spacing relative to an allocated channel N which is permanently allocated for use by an external signal source or has already been temporarily allocated for use by another local signal source. This requirement can be extended to also include an $N\pm 5$ rule, or an $N\pm 9$ rule, or both these rules, that is a channel with a separation of plus or minus 5 channels, or a channel with a separation of plus or minus 9 channels, or both from an already allocated channel N cannot be allocated for use by a local signal source.

The $\pm 1$ channels would usually be avoided in the channel allocation because presently available UHF television tuners do not have sufficiently good selectivity for acceptable adjacent channel discrimination. The other $\pm$ channels can be susceptible to inter-modulation products produced by the IF stages of a UHF television tuner, and their use would therefore preferably also be avoided in this circumstance.

The invention also provides a channel allocation controller for use in said signal distribution cable network, and a method of information channel allocation which the channel allocation controller can perform.

In further considering the nature of the invention, reference will now be made by way of example to the accompanying drawings, of which:

FIG. 1 shows diagrammatically a signal distribution cable network according to the invention;

FIGS. 2 to 7 shows different UHF television channel allocations;

FIG. 8 shows diagrammatically a channel allocation controller for use in the network of FIG. 1.

Figure 3:
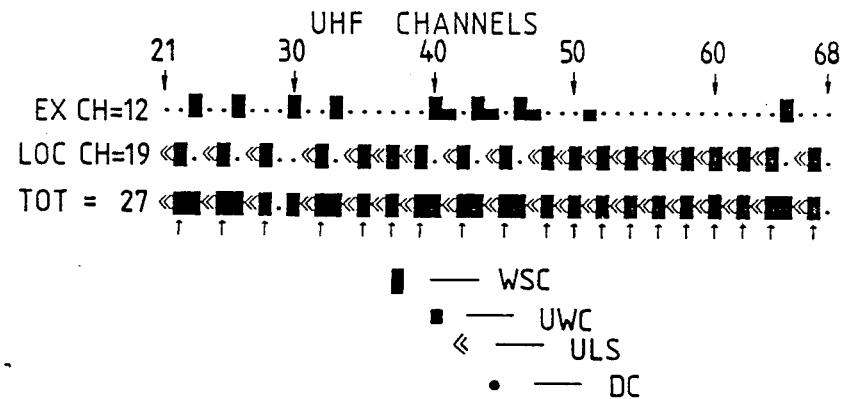

Referring to the drawings, the signal distribution cable network shown in FIG. 1 is assumed to be for a domestic environment and has a coaxial cable as a transmission medium. This coaxial cable comprises a downstream section DS for the transport of information signals in a direction from a controller CT to a plurality of signal destination receivers SR1, SR2, SR3, etc., and an upstream section US for the transport of information signals in the opposite direction from local signal sources SS1, SS2, SS3, etc. Taps T are provided on the coaxial cable for the connection of the signal destination receivers and local signal sources to the relevant cable section. The controller CT provides a connection between the coaxial cable downstream and upstream sections DS and US. The controller CT also provides for the connection to the downstream section DS of a plurality of signal ports SP at which information signals from external signal sources can be received.

As indicated in FIG. 1, the combined signal destination receiver/signal source SR1/SS1 is assumed to be a video tape recorder device VTR, the signal source SS2 is assumed to be a video camera device VC, the signal destination receiver SR2 is assumed to be a television receiver device TV, the signal source SS3 is assumed to be a compact disc player device CD and the signal source SR3 is assumed to be a radio receiver device R. Further, the information signals from external signal sources received at the ports SP are assumed to be UHF television signals, VHF radio signals, and CATV cable television signals. The information signals at the remaining port SP is unspecified.

The signal distribution coaxial cable as comprised by the upstream and downstream sections US and DS provides a predetermined number of information channels which are defined by respective carrier frequencies, each information channel having a given bandwidth around the appertaining carrier frequency. These information channels can be used for selective transport of both externally generated and locally generated information signals to appropriate signal destination receivers. However, for the present purposes only this allocation as applied to information channels selected for the transport of UHF television signals will be considered, but it will be apparent to persons skilled in the art that the principle of the invention can be extended to include channel allocation for other forms of information signal.

The UHF television channel allocation for Bands IV and V in the United Kingdom covers 44 channels which are numbered 21 to 34 and 39 to 68, the carrier frequency for adjacent channels being 8 MHz apart. Details of this channel allocation is given in IBA Technical Review No. 10, May 1978, and therefore will not be considered further in the present specification. A similar though possibly extended frequency allocation is used for these bands in Continental Europe.

The information channels used by UHF television signals that can be received at a location where the signal distribution coaxial cable network is provided are used within the network for the transport of these UHF television signals therein, and these information channels are excluded for allocation for the transport of information signals produced by any of the local signal sources. However, in order to reduce any cross-channel interference to an acceptable level other information channels in the UHF channel band 21 to 69 are also excluded for allocation for the transport of locally generated information signals as determined by certain criteria as explained below.

Consider a location in an area which can receive UHF television signals from a number of different transmitters. An example of such an area is North West Kent in the United Kingdom which receives transmissions from the Crystal Palace (CP) transmitter in channels 23, 26, 30 and 33, from the Bluebell Hill (BH) transmitter in channels 40, 43, 46 and 65 and from the Tunbridge Wells (TW) transmitter in channels 41, 44, 47 and 51.

It is assumed that the network has one UHF aerial directed to receive transmissions from the Crystal Palace transmitter and another UHF aerial directed to receive transmissions from the Bluebell Hill transmitter, so that the television signals received from these two transmitters would be at an acceptable level, whereas television signals which will also be received from the Tunbridge Wells transmitter will be too weak for use. It is also assumed that CATV signals are not present on the UHF band. FIG. 2 shows the utilization of the UHF band by these television signals, together with three cases for the availability of the information channels. The diagram (a) shows which of the UHF channels (UHF CH) 21 to 68 are allocated respectively to the transmitters (TX) CP, BH and TW, together with the total channel allocation. Each channel with a wanted strong information signal is represented by the symbol WSC, each channel with an unwanted weak information signal is represented by the symbol UWC, and the remaining channels are represented by dots DC. The diagrams (b), (c) and (d) show which of the remaining channels, as signified by the symbol IFC, will be excluded from allocation when $N\pm$ rules as referred to earlier in the specification are applied, that is any channel which is prone to cross-channel interference from a channel N with a wanted strong information signal. Diagram (b) shows which of the remaining channels will be excluded from allocation when the $N\pm 1$ rule is applied, diagram (c) shows which of the remaining channels will be excluded from allocation when the $N\pm 5,9$ rules are applied, and the diagram (d) shows which of the remaining channels will be excluded from allocation when the $N\pm 1$ and the $N\pm 5,9$ rules are applied. Without any channel exclusion according to these rules, diagram (a) shows that there is a total TOT of 36 remaining channels which are available for use as local channels, diagram (b) shows that with $N\pm 1$ exclusion rule applied there is a total TOT of 23 remaining channels, diagram (c) shows that with $N\pm 5,9$ exclusion rules applied there is a total TOT of 17 remaining channels, and diagram (d) shows that with $N\pm 1,5,9$ exclusion rule applied, there is a total TOT of 12 remaining channels.

Figure 4:
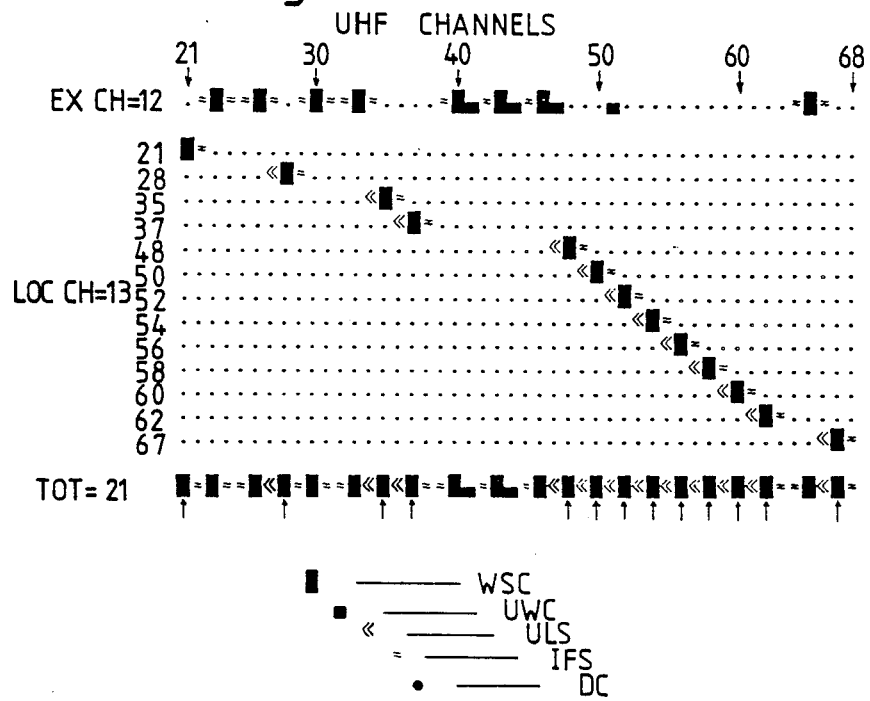

However, once a remaining channel has been allocated as a local channel, it can introduce its own set of excluded channels when the $N\pm 1$ and/or the $N\pm 5,9$ exclusion rules, as the case may be, are also applied to a channel with a strong wanted information signal from a local signal source. Furthermore, it is contemplated for the embodiment of the signal distribution coaxial cable network being described, that the modulation of the carrier frequency of an allocated channel N by a local signal source produces an unwanted lower sideband component which extends into the adjacent $N-1$ channel. This results in different channel availabilities as shown in FIGS. 3 to 7. FIG. 3 shows the 12 external channels EX CH which contain both the wanted strong information signals WSC (8) and the unwanted weak information signals UWC (4). Without any channel exclusion, the remaining channels allow for the allocation of 19 local channels LOC CH each with its unwanted adjacent channel ULS into which the lower sideband of the generated channel signal will extend. This allocation provides a total TOT of 27 useful UHF information channels. FIG. 4 shows the channel allocation when the $N\pm 1$ exclusion rule is applied to both the external channels and the local channels. There are again shown the 12 external channels EX CH, but in this instance the adjacent N±1 channels IFC which may be prone to interference from the external channels (8) containing the wanted strong information signals are also indicated. This allows the allocation of 13 local channels LOC CH each with its associated N−1 adjacent channel ULS containing the unwanted lower sideband and N+1 adjacent channel IFC which may be prone to interference signals from the local channel. This allocation provides a total TOT of 21 useful UHF information channels.

Figure 5:
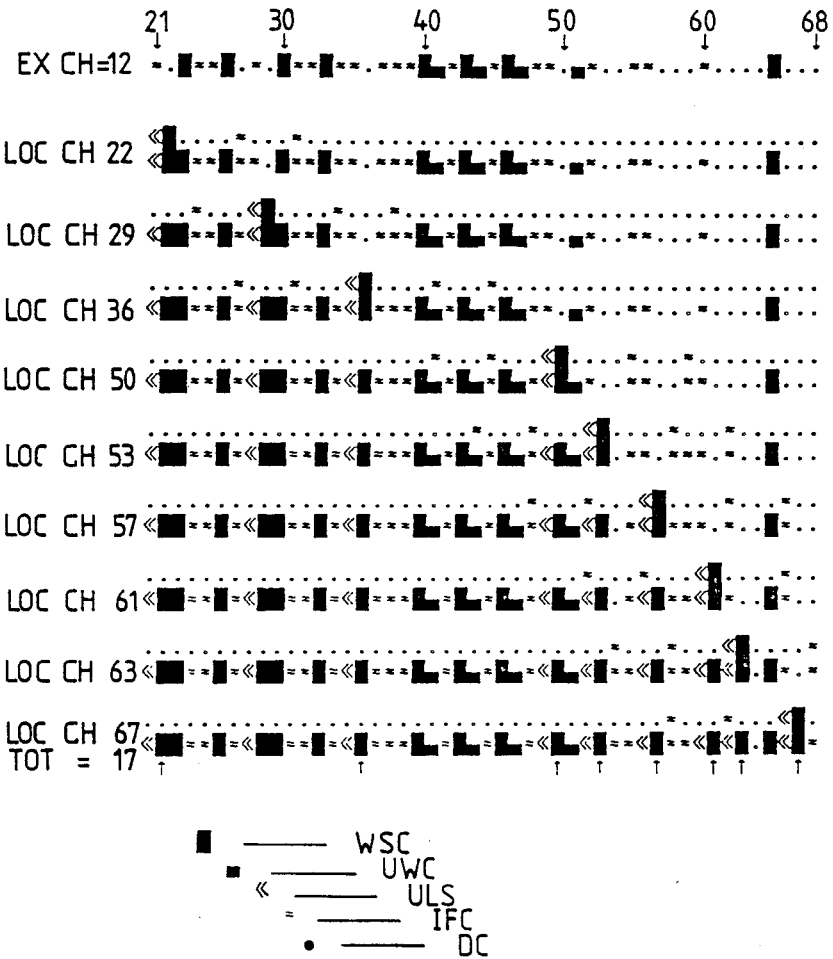
Figure 6:
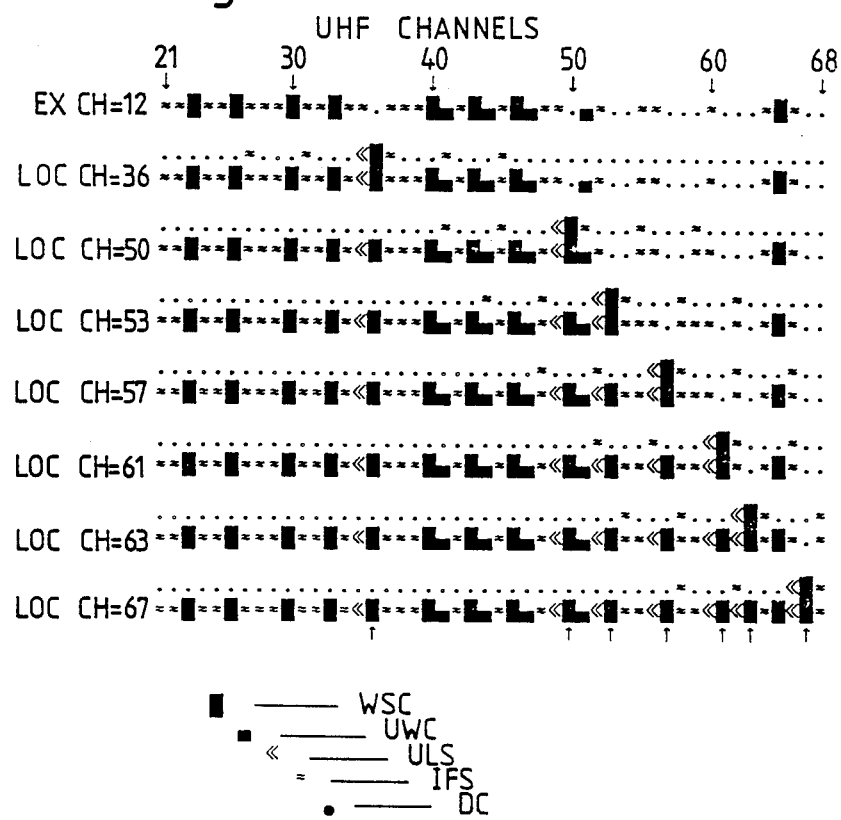
Figure 7:
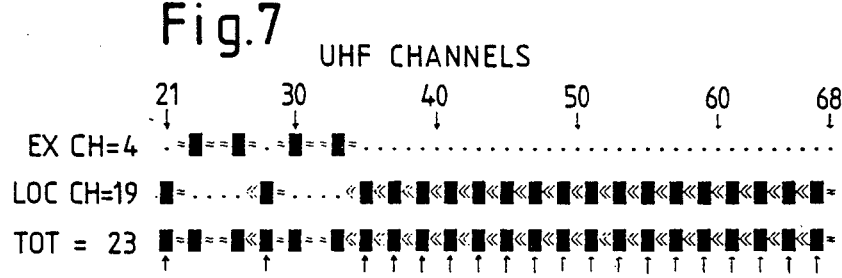

FIG. 5 shows the channel allocation when the N±5,9 exclusion rule is applied. There are again shown the 12 external channels EX CH, and now the N±5,9 channels IFC which may be prone to interference signals from the eight external channels WSC containing the wanted strong information signals are also indicated. When the first free channel DC (22) is allocated as a local channel LOC CH 22, the application of the N±5,9 exclusion rule removes the hitherto free channel DC (27) from subsequent local channel allocation and the next free channel DC which is available for local channel allocation, in numerical order, becomes channel DC (29). When this latter channel is allocated the next free channel for allocation becomes channel DC (36), and so on, FIG. 5 shows the 9 free channels DC that can be allocated to become local channels LOC CH 22, 29, 36, 50, 53, 57, 61, 63 and 67, together with the updating of the availability of the remaining channels after each allocation. Altogether, there is a total TOT of 17 external and local usable channels. FIG. 6 shows an equivalent channel allocation when the N±1,5,9 exclusion rules are applied. In this instance there are only seven local channels LOC CH 36, 50, 53, 57, 61, 63 and 67 available which together with the eight external channels gives a total TOT of 15 usable channels. By way of comparison, FIG. 7 shows the possible channel allocation if an efficient directional aerial directed at the Crystal Palace transmitter CP was used together with a group filter to eliminate reception from external channels outside the range 21 to 34. Therefore, only four external channels EX CH with wanted strong information signals from the transmitter CP are considered. Also, only the N±1 exclusion rule has been applied, it being assumed that the network taps T(FIG. 1) afford sufficient isolation to eliminate intermediate frequency interference. This results in nineteen possible local channels LOC CH to give a total TOT of 23 external and local usable channels, as indicated.

In order to perform channel allocation in accordance with various criteria as exemplified above, an allocation strategy comprising the following steps (i) to (vi) is used.

(i) Determine channels transporting wanted external information signals.

(ii) Determine channels transporting weak unwanted information signals.

(iii) Use different frequency relationships of the channel signals to eliminate from allocation channels likely to suffer from cross-channel interference from both externally generated and locally generated information signals.

(iv) On request, allocate a free channel for use as a local channel for the transport of local information signals and exclude this channel from further allocation until free again.

(v) Program the local signal source (SS) and signal destination receiver (SR) to be involved with the local information signals to operate on the allocated local channel.

(vi) Repeat steps (iv) and (v) until all available free channels are allocated as local channels.

The controller CT (FIG. 1) may be implemented as shown diagrammatically in FIG. 8 so as to perform this channel allocation startegy in dependence on geographical area and number of external (UHF) signal sources. The controller CT comprises a logic device LC together with associated random-access memory RM, a channel frequency selector CFS, a UHF tuner TU with a local oscillator LO, and a signal level detector SLD. The logic device LC is operable on initialisation of the controller (with the local signal sources inhibited) to send successive digital channel tuning command signals tcs to the channel frequency selector CFS which is responsive to these command signals to apply to the tuner TU successive tuning signals ts which tune the local oscillator LO to each UHF channel frequency in turn. The tuner TU also receives external information signals eis through an aerial AE from all external (UHF) broadcast signal sources. As each UHF channel is tuned into, the resulting UHF signal fs produced at the tuner output is applied to the signal level detector SLD. The level of the received signal fs is represented by an analogue voltage signal avs which is produced by the signal level detector SLD. An analogue-to-digital converter AD converts the signal avs into a digital signal dls which is fed into the logic device LC.

The logic device LC is programmed to discriminate between wanted strong signals and weaker unwanted signals from the external (UHF) signal sources, as signified by the value of the digital signal dls for each UHF channel interrogation. The results of this channel interrogation are stored in the memory RM as a first table containing the signal levels of UHF channels 21 to 69 due to external signal sources. From the information in this first table the logic device LC is further programmed to compile a second table of the UHF channels which are not available for use for the transport of information signals produced by local signal sources. Clearly, the second table will include the channels with signals already present. This includes channels containing weak signals because superimposed interference will result from the use of such channels. Also, the second table will include the channels susceptible to interference from channels with strong signals according to the N±1, N±5, and N±9 channel exclusion rules. For example, a strong signal in channel 56 will result in channels 47, 51, 55, 56, 57, 62 and 65 being prone to interference from this strong signal. Weak signals in other channels will not generate significant interference outside the channels containing them. The second table will also contain channels which are allocated at any time for use by local signal sources, together with the related N±1, N±5 and N±9 channels which then become excluded from allocation. However, because possible interference signals from local signal sources will originate at the source itself, it may be possible not to exclude the N±5,9 channels if the signal isolation afforded by the taps T is sufficiently high. Extremely good tuner selectivity at the signal destination receivers would be required before the N±1 channels could be excluded from allocation. Such good selectively may be possible with modern UHF tuners.

Figure 9:
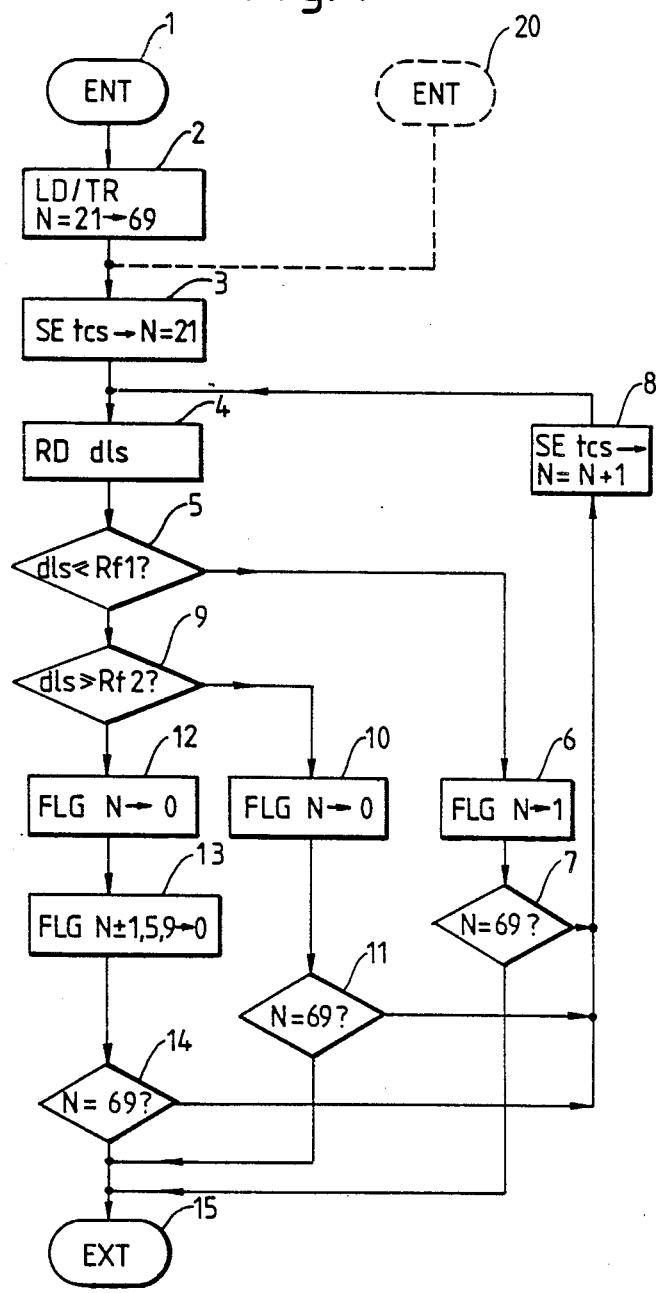
FIGS. 9 and 10 show respective flow charts which represent algorithms performed by the controller of FIG. 8.

Instead of compiling two tables in the memory RM as set forth above, the logic device LC alternatively may be programmed to compile only a single table of all the UHF channels and to indicate in the table by means of a flag for each channel whether or not the channel is available at any time for allocation as a local channel. For this alternative the operations to be performed by the logic device LC for the channel analysis which is carried out on initialization are represented by the flow chart shown in FIG. 9 in which the various elements represent the following instructions or decisions:

(1) ENT:- Enter the channel analysis procedure.

(2) LD/TR N=21→69:- Load into a table register TR the numbers of the UHF channels to be interrogated, that is channel numbers N=21 to 69.

(3) SE tcs→N=21:- Set the command signal tcs to select the first channel N=21. (As described with reference to FIG. 8, this results in the production of the signal dls which indicates the signal level in the channel being interrogated).

(4) RD dls:- The value of the signal dls is read.

(5) dls Rf1?:- The value of the read signal dls is compared with a first reference signal Rf1. (When the signal dls is less than, or equal to, this first reference signal Rf1, this means that the channel N being interrogated is a free channel and step (6) is entered).

(6) FLG N→1:- Set to '1' in a flag position of the table register TR a flag pertaining to the channel N being interrogated. (This signifies that the channel N concerned is free and available for selection for transporting signals from a local signal source).

(7) N=69?:- Is the channel N being interrogated the last channel N=69? (When N=69, the channel analysis procedure is exited at step (15). When N is not equal to 69, step (8) is entered).

(8) SE tcs→N=N+1:- The command signal tcs is set to select channel number N as incremented by one, and step (4) is returned to read the signal dls for the next channel to be interrogated. (When the read signal dls is greater than the first reference signal Rf1, step (9) is entered from step (5)).

(9) dls≧Rf2:- The value of the read signal dls is compared with a second reference signal Rf2. (When the signal dls is less than this second reference signal Rf2, this means that the channel being interrogated cannot be allocated as a free channel, because it contains a weak signal, and step (10) is entered).

(10) FLG N→0:- Set to '0' in the flag register position of the table register TR a flag pertaining to the channel N being interrogated. (This signifies that the channel N concerned is not free for selection for transporting signals from a local signal source).

(11) N=69?:- This step corresponds to step (7) and either step (8) or step (15) is entered, as the case may be. (When the read signal dls is equal to or greater than the second reference signal Rf2, this means that the channel being interrogated cannot be allocated as a free channel because it contains a strong signal, and step (12) is entered).

(12) FLG N→0:- Set to '0' in the flag position of the table register TR a flag pertaining to the channel N being interrogated. (This signifies, like step (10), that the channel N concerned is not free for allocation for transporting signals from a local signal source, and step (13) is entered).

(13) FLG N±1,5,9,→0:- Set to '0' in the flag position of the table register TR each flag pertaining to the channel numbers that are one channel number, five channel numbers, and nine channel numbers removed from the channel N being interrogated). (This signifies that these additional channels are not free for allocation for transporting signals from a local signal source, and step (14) is entered).

(14) N=69?:- This step corresponds to steps (7) and (11) and either step (8) or step (15) is entered, as the case may be.

(15) EXT:- Exit the channel analysis procedure.

Figure 10:
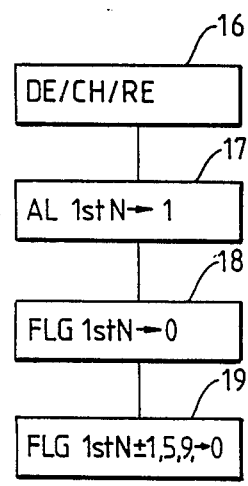

The flow chart shown in FIG. 10 represents the operations which will subsequently be performed by the logic device LC in response to a request for the allocation of a free channel for the transport of signals from a local signal source to a signal destination receiver.

(16) DE/CH/RE:- Detect a channel request signal received at an interface IF of the controller (FIG. 8).

(17) AL 1st N→1:- Allocate the first channel N in the register table TR that has its flag set to 1.

(18) FLG 1st N→0:- Set to '0' this flag which pertains to the channel N allocated in step (17).

(19) FLG 1st N±1,5,9→0:- Set to '0' the flags which pertain to the channels that are ±1,5,9 channel numbers removed from the channel N allocated in step (17).

(20) TX/CS:- Transmit a channel select signal via the interface IF to the signal destination receiver and also to the local signal source.

The logic device LC is further programmed to check periodically the channel information (i.e. the flags) in the memory RM so as to make available for further allocation channels which subsequently become free. This may be achieved by periodically entering the channel analysis procedure at step (3) from an auxiliary enter step (21) as indicated in broken line. This will cause all the 48 channels N=21 to 69 to be checked periodically, so that marginally acceptable or unacceptable channels can be re-graded for allocation or not as appropriate.

The controller CT may be implemented using commercially available circuit components and devices. For instance, the logic device LC is suitably a microcomputer from the Philips MAB 8400 series; the channel frequency selector CFS can be a Computer Interface for Tuning and Control (CITAC) integrated circuit type SAB 3037 (Philips) which is controlled by a two-wire bi-directional I$^2$C bus (not shown); and the tuner TU can be a UHF television tuner type U744 (Philips). The signal level detector can be an analogue voltage comparator circuit of known form. An amplifier device AMP provides one-way signal isolation between the upstream and downstream coaxial cable sections US and DS.

The converter AD provides conventional digitial-to-analogue conversion of the analogue voltage signal avs produced by the signal level detector SLD. The interface device IF effects connection between the logic device LC and the coaxial cable sections DS/US for the transmission and reception of control signals to and from the local signal sources SS and the signal destination receivers SR. Alternatively, as indicated in broken line in FIG. 1, a separate control bus CB can be provided for these control signals. The control signals to be transmitted may be from the RC5 command signal range which is extensively used in the art for the remote control of television receivers and video tape recorder/players by means of IR remote control units.

A typical operating sequence for the allocation of a free channel for the transport of information signals from the local signal source SS1 (VTR) to the signal destination receiver SR2 (TV) may be as follows, based on the premise that both the receiver and the source include a computer/channel frequency selector/UHF tuner combination of conventional form.

A user of the receiver SR2 transmits from his remote control unit a request signal for receiving the program available in the source SS1 and this request signal is received by the controller CT. When the request signal pertains to a program channel which is available from an external signal source and is a fixed information channel, the receiver SR2 is tuned to that channel by a channel select signal from the controller CT. When the request signal is identified by the controller CT as a local channel request signal the logic device LC is responsive to this request signal to perform the operations represented by the flow chart shown in FIG. 10. The number of the resulting allocated channel N is transmitted to both the source SS1 and the receiver SR2 and is utilized therein to tune the apparatus to the carrier frequency of the allocated channel. As regards the source SS1 this will necessitate the inclusion therein of a modulator which can be programmed to operate at the carrier frequency of the allocated channel. Such a programmable modulator will form an addition to the source apparatus. The receiver SR1 can simply have a control interface link with the coaxial cable (or control bus). Both the source SS1 and the receiver SR2 receive a tuning command signal transmitted to them by the logic device LC and are set to operate at the carrier frequency of the allocated channel by this tuning command signal. Alternatively, the receiver SR1 could be tuned manually by a user to a temporary test pattern transmitted by the controller in the allocated channel.

Various other modifications are possible with the scope of the invention. For instance, instead of the initial channel table in the channel controller memory being compiled dynamically by the controller in accordance with the signal levels present in the channels, a read-only memory could be provided which contains a fixed table listing the free channels that pertain to a particular location where the network is to be used. This table can have associated with it a write/read random access flag register in which the flags which signify the actual channel availability are contained.

Certain local signal sources, for instance the transmitter of an alarm system, may be arranged to operate using only one particular information channel. In this instance, this limitation would be signified to the controller when a channel request is received by it for such a local signal source, so that the controller can allocate to this source the channel concerned, provided that this channel is free when the request is received.

The exclusion rules which exclude channels for temporary allocation to transport signals from a local signal source can vary from location-to-location (e.g. in different countries), and may take account of different channel bandwidths. For example, the rules for the allocation of VHF channels, both television and radio, would be different to those for the allocation of UHF channels.

The temporary allocation of free channels for the transport of signals from a local signal source can be on a noise basis, rather than numerically; that is, the free channels would be graded according to the subsisting level of signal (noise) in them and each time the least noisy channel would be allocated when a channel request is received. This would involve a more complex algorithm which the logic device in the controller would perform for determining the channel noise levels at any time.

The channel allocation controller can also be operable to measure the signal level in each channel and, if necessary, effect alteration of the signal level to achieve equal signal amplitudes for all the channels. This may be done on initialisation.

Instead of the external signal sources being allocated fixed channels which are the same as their broadcast channels, they may be allocated other respective fixed channels for transporting their information signals over the network cable. The controller would be operable to effect the demodulation and remodulation of these signals onto their new channels.

In order to allow the use of those channels the subject of the N±5,9 exclusion rules the carrier frequency for a local information channel can be made, say, between 1 and 2 MHz higher than the carrier frequencies for the prescribed UHF broadcast channels which would overcome the previously mentioned problems in relation to IF stages. This would then enable a greater number of local information channels to be used in the UHF bands.

One of the signal sources/receivers mentioned in relation to FIG. 1 is a video tape recorder device and this has been treated as a receiver or a source of television signals with accompanying sound signal. However some video recorders are able to record/replay two further signals which are normally the left (L) and right (R) signals of a pair of stereo related audio signals which may or may not accompany a television program. On replay these left and right signals may be combined to produce respective sum (L+R) and difference (L−R) signals which can be frequency modulated onto the carrier of an available channel in the VHF Band II between 88 and 108 MHz although currently some part of this band is used for mobile communications which part can be excluded. The manner of modulation will correspond to that used for VHF FM stereo radio transmissions and can be received by a suitable FM radio receiver connected to the downstream bus. Allocation of the free channels in the VHF band II will be on a similar basis to that described for the UHF bands but using the appropriate exclusion rules for that VHF band. Audio signals to be recorded as the further signals on the video recorder can be conveyed thereto in a similar manner. Audio signals to and from other audio equipment e.g. HiFi separates, combined audio systems or audio stacker units, can also be treated in a similar manner.

Some audio equipment is capable of providing a digitally encoded output, one such being certain compact disc players which produce a 2.8 Mb/s serial data bit stream. Instead of using the analogue output from such equipment the digitally encoded data can be used to digitally modulate the carrier frequency of an allocated free channel. On reception such digital data would simply require being digitally-to-analogue converted before being applied to suitable audio equipment for reproduction or recording. In the United Kingdom use could be made of the VHF Band I (41 to 68 MHz) and Band III (174 to 216 MHz) formerly used to convey 405 line television signals although parts of these bands are currently used for mobile communication purposes which parts would need to be avoided. The allocation of free channels would again depend upon the appropriate exclusion rules for those VHF rules. However in Continental Europe the VHF Bands I and III are still used to convey television signals and if it is not possible to find suitable space within these bands to allocate a free channel or channels then this digital information can be conveyed in the UHF bands.

From reading the present disclosure, other modifications will be apparent to persons skilled in the art. Such modifications may involve other features which are already known in the design, manufacture and use of systems and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A signal distribution cable network in which frequency division multiplexing is employed to provide a plurality of information channels which are defined by respective carrier frequencies, characterized in that said network comprises a channel allocation controller which is operable on request to allocate temporarily an unused channel for the transport of information signals from a local signal source to a signal destination receiver, the controller including means for transmitting tuning signals to the local signal source and the signal destination receiver to tune them to the carrier frequency of the allocated channel, and the controller being operable to exclude from further allocation the allocated channel whilst it is in use.

2. A signal distribution cable network as claimed in claim 1, characterized in that said channel allocation controller includes means operable on initialisation of the network to determine the signal level in each information channel, and means responsive according as the signal level of a channel is below or above a first reference level to grade the channel as being suitable or not as a free channel for temporary allocation for the transport of information signals from a local signal source connected to the network.

3. A signal distribution cable network as claimed in claim 1 or claim 2, characterized in that in respect of information channels for transporting UHF signals, a channel allocation strategy governing the temporary allocation of unused channels for the transport of information signals from local signal sources involves that for the transport of information signals from external signal sources, there is the permanent allocation of respective information channels whose carrier frequencies are the same as the carrier frequencies of these external signal sources, and for the transport of information signals from any local signal source which is to transmit there is the temporary allocation of an unused channel from all the remaining unused channels in which the prevailing signal level is less than a given value and on the basis of at least one given channel separation rule which aims at minimizing cross-channel interference.

4. A signal distribution network as claimed in claim 3, characterized in that the channel allocation strategy involves that no channel allocation in respect of a local signal source is made of a channel which is plus or minus one channel spacing relative to an allocated channel which is permanently allocated for use by an external signal source or has already been temporarily allocated for use by another local signal source.

5. A signal distribution cable network as claimed in claim 4, characterized in that the channel allocation strategy involves that no channel allocation in respect of a local signal source is made of a channel which is plus or minus five channel spacings relative to an allocated channel which is permanently allocated for use by an external signal source or has already been temporarily allocated for use by another local signal source.

6. A signal distribution cable network as claimed in claim 5, characterized in that the channel allocation strategy involves that no channel allocation in respect of a local signal source is made of channel which is plus or minus nine channel spacings relative to an allocated channel which is permanently allocated for use by an external signal source or has already been temporarily allocated for use by another local signal source.

7. A signal distribution cable network as claimed in claim 6, characterized in that a serial digital data link included in the network is operable to use the network cable for the transmission of control signals between the controller and local signal sources and the signal destination receivers to effect the tuning thereof to an allocated channel.

8. A channel allocation controller for use in a signal distribution cable network as claimed in claim 6, said controller having the features specified in claim 6.

9. A central controller as claimed in claim 8, comprising a microprocessor and associated memory, a channel frequency selector, a tuner including a local oscillator, a signal level detector, and an interface for connecting the controller to the network cable, said microprocessor being programmed according to an algorithm to cause the channel frequency selector to tune the tuner to the carrier frequency of each channel in turn, said signal level detector being responsive to detect the level of the signal in the channel concerned, and said microprocessor being responsive to the signal value as received by it from said signal level detector to record in the memory the availability or not of the channel concerned as a free channel suitable for allocation to transport signals from a local signal source.

10. A controller as claimed in claim 9, characterized in that said microprocessor is further programmed so as, in use of the network in which it is located, to record in the memory the subsequently non-availability of the allocated free channel and further channels as determined by said algorithm, the microprocessor periodically checking the channel information in the memory and being operable to make available for further allocation channels which subsequently become free.

11. A method of allocating information channels for the transport of information signals, from both external and local signal sources, in a signal distribution cable network in which frequency division multiplexing is employed to provide a plurality of information channels which are defined by respective carrier frequencies, which method comprises the steps of:
 (i) determining those channels transporting wanted external information signals from external signal sources,
 (ii) determining those channels transporting weak unwanted information signals, (iii) by the use of different frequency relationships of the channel signals, eliminating from allocation those channels likely to suffer from cross-channel interference from both external and local information signal sources.

(iv) on request, allocating a free channel for use as a local channel for the transport of a local information signal from a local signal source and excluding this channel from further allocation until free again.

(v) programming the local signal source and signal destination receiver concerned with the local information signal to operate on the allocated local channel, and (vi) repeating as necessary steps (iv) and (v) until all available free channels are allocated as local channels.

* * * * *